April 4, 1950 L. LEE, II 2,502,574
CONTROL APPARATUS FOR INTERNAL-COMBUSTION ENGINES
Original Filed March 26, 1945 3 Sheets-Sheet 3

INVENTOR
*Leighton Lee II.*
BY
ATTORNEY

Patented Apr. 4, 1950

2,502,574

UNITED STATES PATENT OFFICE 2,502,574

CONTROL APPARATUS FOR INTERNAL-COMBUSTION ENGINES

Leighton Lee, II, Rocky Hill, Conn., assignor to Niles-Bement-Pond Company, West Hartford, Conn., a corporation of New Jersey Original application March 26, 1945, Serial No. 584,867, now Patent No. 2,478,288, dated August 9, 1949. Divided and this application May 27, 1949, Serial No. 95,805

4 Claims. (Cl. 123—25)

This application is a division of my copending application for Control apparatus for internal combustion engines, Serial No. 584,867, filed March 26, 1945, now Patent Number 2,478,288, issued August 9, 1949.

The present invention relates to control apparatus for internal combustion engines, and particularly to apparatus for controlling the supply of fuel and supplementary combustion regulating fluid to such an engine.

Such supply systems for internal combustion engines may, generally speaking, be classified either as carburetor type systems, in which the fuel and supplementary fluid is mixed with the air in the air induction system of the engine, after which the mixture is distributed through the intake manifold to the cylinders; or as distributor type systems, where the fuel and supplementary fluid supply for the engine is broken up by one or more distributor mechanisms into small charges for the individual cylinders, and each of these charges is conveyed to a cylinder by a suitable conduit. In distributor type systems, each fuel and supplementary fluid charge may be fed directly into a cylinder; or it may be fed to a separate spray nozzle for each cylinder, located in the intake manifold adjacent the intake valves of the cylinder; or the main fuel supply may be fed into a common air intake manifold connected to all the cylinders, while the supplementary fluid supply is broken up by a distributor mechanism into small charges for the individual cylinders and each charge conveyed to a cylinder by a suitable conduit. The present invention relates particularly to the last mentioned type of distributor fuel and supplementary fluid supply system.

An object of the present invention is to provide a fuel and supplementary fluid supply system for an internal combustion engine, including improved means for distributing and controlling the flow of supplementary fluid to the engine.

Another object of the present invention is to provide, in connection with the fuel supply system of an internal combustion engine, improved means for supplying to the engine a supplementary fluid, and for measuring and controlling the supply of that fluid in accordance with the rate of flow of fuel to the engine.

Another object is to provide improved fuel and supplementary fluid flow regulating apparatus.

Another object is to provide improved mechanism for distributing small quantities of supplementary fluid successively to the cylinders of an internal combustion engine.

A further object is to provide improved valve mechanism for use in a system of the type described.

Other objects and advantages of the present invention will become apparent from a consideration of the appending specification, claims and drawings, in which:

Figure 1:
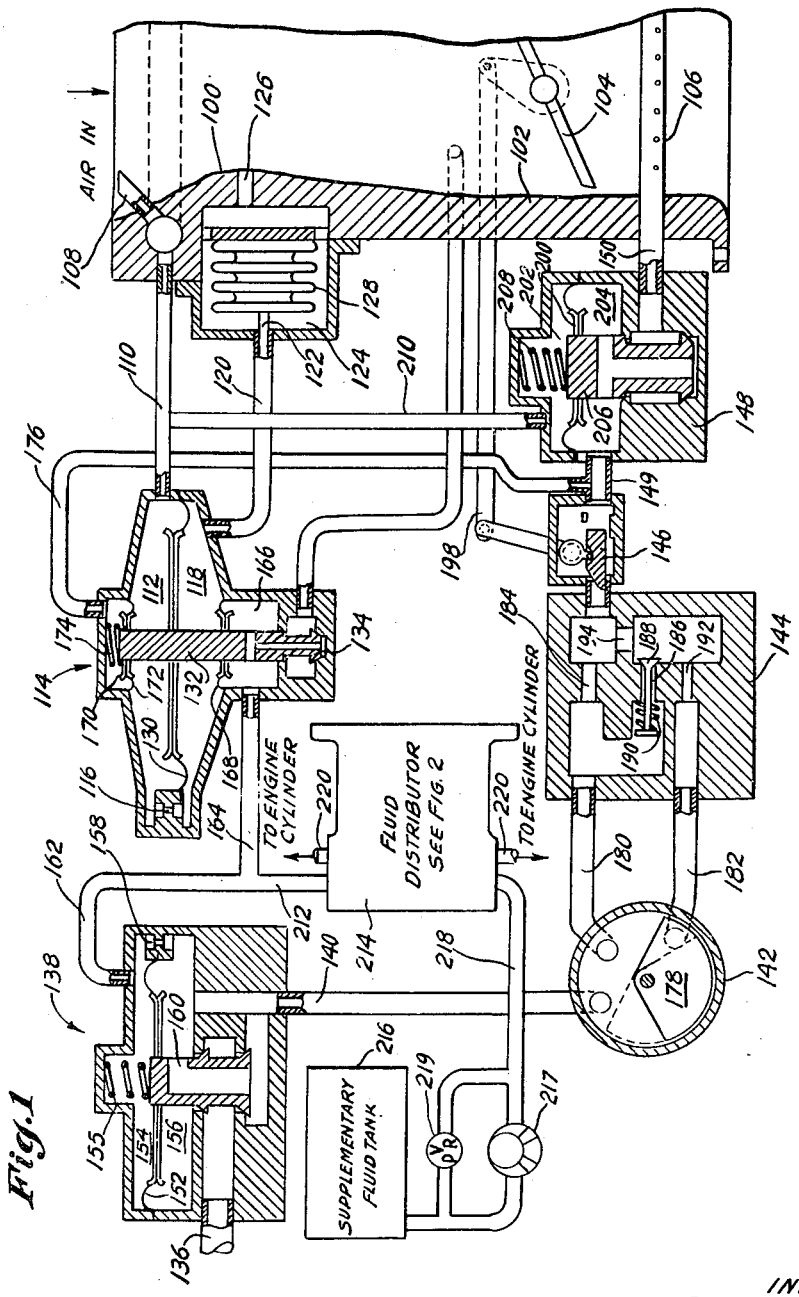
Figure 1 illustrates, somewhat diagrammatically, a fuel supply system for an internal combustion engine embodying the principles of my invention.

There is shown in Figure 1 a carburetor for an internal combustion engine equipped with a supplementary combustion regulating fluid distributor mechanism for supplying such fluid directly to the cylinders of the engine. The distributor itself is shown in detail in Figures 2 and 3.

In Figure 1, combustion air flowing to the engine passes through a venturi 100 and a passage 102 having a throttle 104 and a fuel discharge nozzle 106.

The air differential pressure created by the venturi 100 creates a flow of air through a secondary air passage which may be traced from impact tubes 108 through a conduit 110, a chamber 112 in a fuel meter indicated at 114, a restriction 116, another chamber 118, a conduit 120, past a valve 122, into a chamber 124 and thence through a conduit 126 to the throat of venturi 100. The valve 122 is positioned by a bellows 128 mounted in the chamber 124. The function of the bellows 128 and the valve 122 is to reduce the total pressure differential produced by the venturi 100 by an amount sufficient to correct for changes in the temperature and density of air, so that the pressure drop appearing across restriction 116 is a measure of the mass of air flowing through the venturi 100 per unit time. The pressure drop across restriction 116 is applied to a diaphragm 130 which separates the chambers 112 and 118. The diaphragm 130 is attached at its center to the stem 132 of a pilot valve 134.

Fuel flowing to the engine comes from a suitable pump or other source of fuel under pressure and flows through a conduit 136, a flow controlling valve 138, a conduit 140, a mixture control 142, a jet system 144, an idle valve 146, a pressure regulating valve 148, and a conduit 150 to the fuel discharge nozzle 106.

The fuel flow regulator 138 includes a diaphragm 152, separating a pair of expansible chambers 154 and 156. These chambers are connected by a restriction 158. The diaphragm 152 is attached at its center to a valve 160, which controls the flow of fuel from conduit 136 into conduit 140. The chamber 156 is connected to conduit 140. The chamber 154 is connected through conduits 162 and 164 to a chamber 166 in the fuel meter 114. The chamber 166 is separated from chamber 118 by a flexible diaphragm 168. The fuel meter 114 also includes a chamber 170 separated from chamber 112 by a diaphragm 172. A spring 174 biases the valve 134 toward closed position. The chamber 170 is connected through a conduit 176 to the conduit 149 on the downstream side of the jet system 144.

The mixture control 142 includes a disc valve 178, movable between the position shown in full lines in the drawing, hereinafter termed its lean position, and a position shown in dotted lines in the drawing, hereinafter termed its rich position. When the mixture control valve 178 is in its lean position, fuel can flow from the mixture control 142 to the jet system 144 only through a conduit 180. When the mixture control valve 178 is in its rich position, fuel can flow to the jet system either through conduit 180 or through a conduit 182.

Fuel entering the jet system 144 through conduit 180 passes either through a fixed restriction 184 or through a restriction 186 controlled by an enrichment valve 188, biased to closed position by a spring 190. Fuel flowing to the jet system 144 through conduit 182 passes through a fixed restriction 192. Fuel flowing through the restrictions 186 and 192 also flows through a restriction 194.

The idle valve 146 is normally open, but moves toward its closed position as the throttle moves into a range of positions adjacent its closed position, so as to regulate the fuel flow. At such times, the air pressure differential set up by the venturi is an unreliable indication of the air flow. Therefore, it is considered better to increase the opening of valve 160 disproportionately to the air pressure differential set up by the venturi, and to regulate the fuel flow by means of the idle valve 146, which is connected to the throttle by means of a link 198. The disproportionate increase in the opening of valve 160 is secured by the use of the springs 155 and 174, which bias their associated valves in a fuel flow increasing direction.

The pressure regulator 148 includes a diaphragm 200 separating a pair of expansible chambers 202 and 204. The diaphragm 200 is attached at its center to a valve 206. A spring 208 biases the valve 206 toward closed position. The chamber 204 receives fuel from conduit 149. The chamber 202 is connected through a conduit 210 to the conduit 110.

Figure 2:
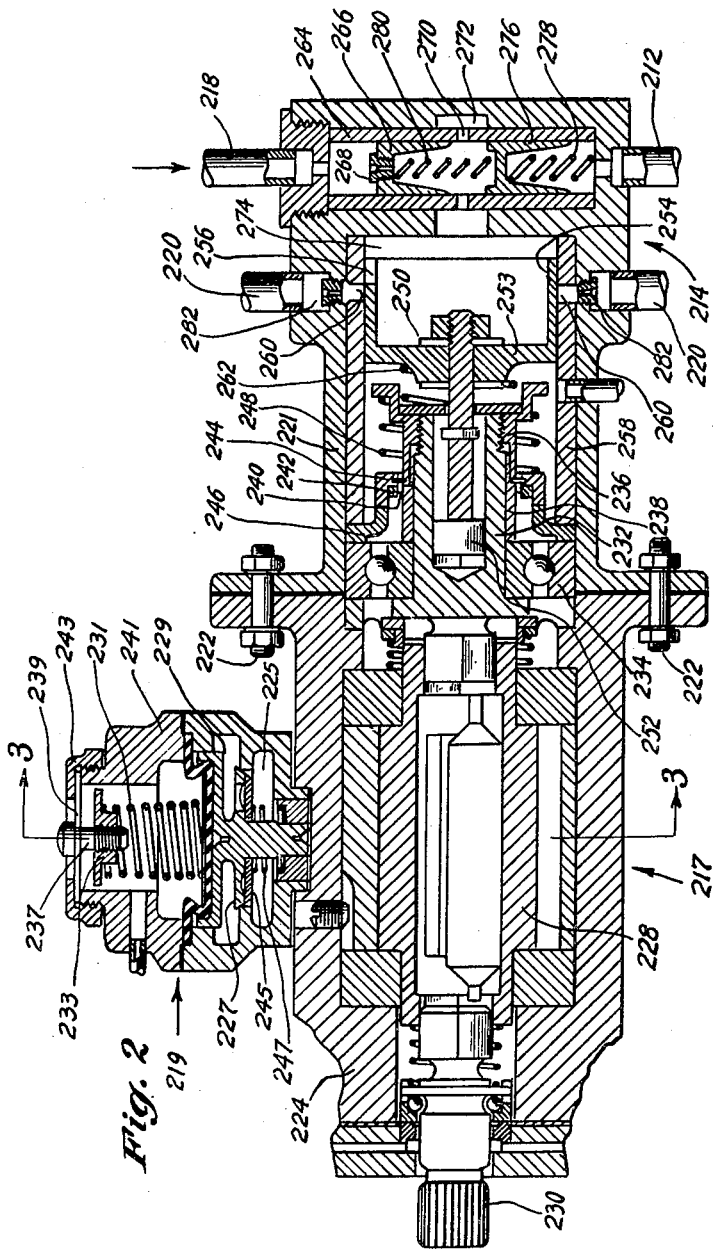
Figure 2 illustrates a combined rotary pump and fluid distributor valve mechanism which is shown diagrammatically in Figure 1.
Figure 3:
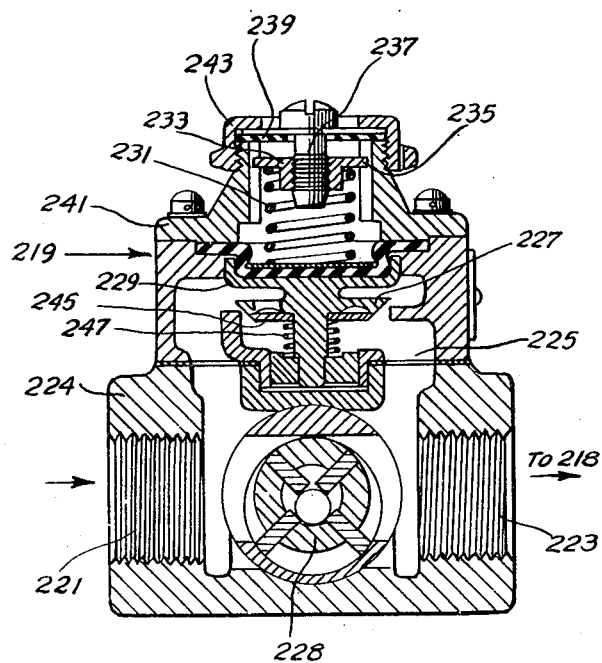
Figure 3 is a cross-sectional view taken on the line 3—3 of Figure 2.

The conduit 162 is connected by a conduit 212 to a supplementary combustion regulating fluid distributing and regulating mechanism illustrated in detail in Figures 2 and 3. The distributor 214 receives fluid to be distributed to the cylinders of the engine from a tank 216 through a pump 217 and a conduit 218. A pressure relief valve 219 is provided to maintain a substantially constant discharge pressure at the pump 217. The distributor 214 distributes the fluid to lines 220 leading to the respective engine cylinders, in quantities determined by the pressure in conduit 212.

The pump 217 and the distributor 214, which are shown diagrammatically in Figure 1, are set forth in detail in Figures 2 and 3. Referring to Figure 2, it will be noted that the distributor 214 is built in a housing 221 attached by means of bolts 222 to a housing 224 containing the pump 217, of generally conventional design. The pump 217 includes a rotor 228 driven by a shaft 230, which is splined at its end so that it may be readily driven through a suitable connection from the engine.

The pump receives fuel through an inlet connection 221 and discharges it through an outlet 223 (Figure 3). The pump discharge pressure is regulated by a relief valve generally indicated at 219. Fluid at the pump discharge pressure flows into a relief passage 225, where it acts upwardly on the under side of a valve 227. The upper surface of valve 227 is attached to a guide 229. The guide 229 and valve 227 are biased in a valve closing direction by a spring 231. The upper end of spring 231 acts against a retainer nut 233, which is held against rotation by diametrically opposite projections 235, which slide in grooves in the valve cover 241 (Figure 3). The nut 233 is vertically adjustable to vary the spring tension by means of a screw 237 on which the nut 233 is threaded. The screw 237 is provided with a flange 239 which may be clamped between the valve cover 241 and a locking cap 243 to hold the nut 233 in any adjusted position. The valve 227 and guide 229 are balanced against pump inlet pressure.

A by-pass valve 245 is provided in the form of a thin disk biased upwardly against the under side of valve 227 by means of a spring 247. The disk valve 245 closes apertures in the valve 227. If for any reason the pump inlet pressure becomes greater than the discharge pressure, the valve 245 opens, allowing fluid to by-pass the pump. This arrangement is useful when two pumps are connected in series in a fluid line. If one pump fails to operate for some reason, the by-pass valve on that pump opens to allow the other pump to move fuel past it.

If the pump discharge pressure tends to increase above the value established by the force of spring 231, the relief valve opens, allowing part of the fuel discharged to return to the pump inlet. The valve continues to open wider until the pump discharge pressure is reduced to a value which just balances the force of spring 231. Therefore, the pump discharge pressure is held at a substantially constant value.

The opposite end of rotor 228 is drivingly connected to a shaft 232, which turns in a bearing 234 in the housing 221. A collar 236 is threaded on the right end of shaft 232. Another collar 238 surrounds the shaft 232 between collar 236 and bearing 234. A flexible diaphragm 240 is clamped between the collars 236 and 238. The outer edge of diaphragm 240 is clamped between a pair of rings 242 and 244, which are press fitted together in nesting relationship. The left end of the ring 244 has a sliding contact with a stationary seal ring 246. The diaphragm 240, and the running seal together prevent leakage of fluid along the outside of shaft 232. A spring 248 is retained between the collar 236 and the ring 244 to maintain the running seal surfaces in engagement.

A piston rod 250 is provided with a squared end 252 slidable in a square recess at the axis of shaft 232. The other end of rod 250 is attached to a piston 253. The rod 250—252 and the piston 253 continuously rotate with the shaft 232. The piston 253 is provided with a skirt 254 which is slotted, as at 256, to provide fluid communication between the chamber 274 at the right end of piston 253 and a plurality of ports 260 which extend through to the wall of the cylinder 258 in which the piston 253 rotates.

A spring 262 retained between the collar 236 and the piston 253 biases the latter for movement to the right, in a direction such that the end of the slot 256 tends to close the ports 260.

Fluid entering the distributor 214 for distribution thereby passes from conduit 218 into a cylinder 264. A piston 266 is movable within the cylinder 264. A fixed metering restriction 268 provides fluid communication between the opposite sides of the piston. The lower edge of the piston 266 serves as a valve to control the area of a number of ports 270. The ports 270 pass through the walls of the cylinder 264 and lead to a recess 272 which communicates with the chamber 274 on the right hand side of piston 253.

Another piston 276 is located in the cylinder 264. The piston 276 is biased upwardly by a spring 278. Another spring 280 is retained between the upper surface of the piston 276 and the lower surface of the piston 266. The space under the piston 276 is subject to the pressure in the conduit 212, to which it is connected.

It may be seen that fluid entering the distributor 214 flows through conduit 218, cylinder 264, restriction 268, ports 270, recess 272, chamber 274, and out through the ports 260 to the respective cylinders of the engine. The quantity of fluid discharged through the ports 260 depends upon the pressure available in the chamber 274 to act on the piston 252 and compress the spring 262. That pressure is controlled by the piston 266 which acts as a valve to control the area of the ports 270. The piston 266 is positioned by the pressure drop across restriction 268, which pressure drop is opposed by spring 280. The pressure drop across restriction 268 is a measure of the rate of flow of fluid through that restriction. For any given setting of the spring 280 the piston 266 will assume a position where the fluid flow through restriction 268 and ports 270 is just enough so that the pressure drop across restriction 268 balances the force of spring 280. The force of spring 280 and hence the rate of flow of fluid through the distributor 214 is determined by the pressure in conduit 212, which acts on the piston 276 to set the position of the lower end of spring 280. The amount of supplementary fluid discharged to the engine by the distributing mechanism 214 is therefore proportional to the pressure in conduit 212.

A restriction 282 is shown in each of the ports 260. These restrictions are removable, and may be utilized to increase the amount of supplementary fluid flow to one or more of the cylinders relative to the amount supplied to the other cylinders. It has been found that in a modern aircraft engine having a large number of cylinders, certain cylinders tend to run hot, either because of uneven cooling or because of the uneven fuel distribution to the cylinders. When this condition occurs the mechanism shown may be utilized to supply an additional amount of supplementary fluid to the cylinders which are running hot. The supplementary fluid may be water or a water and alcohol mixture, or other suitable fluid capable of regulating combustion in the engine cylinders so as to prevent knocking or overheating of the engine.

*Operation*

The pressure in chamber 154 of the fuel flow regulator 138 is a measure of the unmetered fuel pressure in chamber 156, since the difference between these two pressures is the force of spring 155 which may be considered as being constant without appreciable error.

The pressure drop across the fuel metering jet system 144 may be taken as a measure of flow of fuel to the engine, as long as the area of the metering restriction open to the flow of fuel remains constant. Since the metered fuel pressure on the downstream side of the jet system is maintained substantially constant by the regulator 148, the unmetered fuel pressure on the upstream side of the jet system may itself be used as a measure of the fuel flow. Furthermore, as set forth above, the pressure in chamber 154 is a measure of the pressure in chamber 156, which is substantially the same as the unmetered fuel pressure on upstream side of the jet system. Therefore, the pressure of chamber 154 may be used as a measure of the rate of fuel flow to the engine. The pressure of chamber 154 is transmitted through conduits 162 and 164 to chamber 166 in the fuel meter 114.

The valve 134 in the fuel meter 114 is positioned in accordance with the difference between the air pressure differential acting downwardly on diaphragm 130, which is a measure of the rate of flow of air to the engine, and the fuel pressure differential between chambers 166 and 170, which acts upwardly on the valve 134, and is a measure of rate of fuel flow to the engine. The position of valve 134 determines the pressure in chamber 166 and hence the pressure in chamber 154 and thereby the rate of fuel flow. It may therefore be seen that the fuel meter 114 acts to maintain a constant ratio between the fuel flow and the air flow. This ratio may, of course, be varied by operation of the mixture control valve 178, or by opening of enrichment valve 188, which occurs at high fuel pressure differentials. Furthermore, since the fuel pressure in conduit 212 and conduit 162 is communicated through conduit 212 to the fluid distributor 214, it may be seen that the amount of fluid distributed directly to the cylinders is maintained proportional to the rate of flow of air to the engine, and hence, for a given open area of the fuel metering restriction, proportional to the rate of flow of fuel to the engine.

While I have shown and described certain preferred embodiments of my invention, other modifications thereof will readily occur to those skilled in the art, and I therefore intend my invention to be limited only by the appended claims.

I claim as my invention:

1. A charge forming apparatus for an internal combustion engine, comprising an air supply passage, a fuel system for supplying fuel to said passage in a substantially constant ratio to said air supply, and means for distributing individual charges of a supplementary combustion regulating fluid to the individual cylinders of said engine in predetermined proportion to the rate of fuel supply.

2. A charge forming apparatus for an internal combustion engine, comprising an air induction system, a fuel supply system, means for controlling the rate of flow of fuel to said engine to maintain a substantially constant fuel-to-air ratio, means for distributing individual charges of a supplementary combustion regulating fluid to the individual cylinders of said engine, and means responsive to the rate of flow of fuel to said engine for controlling the rate of discharge of said supplementary fluid.

3. A charge forming apparatus for an internal combustion engine, comprising an air induction system, means for discharging fuel into the air flowing through said induction system, means for controlling the amount of fuel so discharged to maintain a substantially constant fuel-to-air ratio, means for distributing a supplementary combustion regulating fluid to the several cylinders of said engine, and means responsive to the rate of discharge of fuel into said air induction system for controlling the rate of discharge of said supplementary fluid.

4. A charge forming apparatus for an internal combustion engine, comprising a fuel conduit, a fixed metering restriction in said conduit, means for maintaining a substantially constant pressure in said conduit on one side of said restriction, means for varying the pressure in said conduit on the other side of said restriction to vary the pressure differential thereacross and hence the fuel flow therethrough, means for discharging a supplementary combustion regulating fluid to the several cylinders of said engine, a conduit for said supplementary fluid, a cylinder forming a portion of said conduit, a piston in said cylinder, a passage including a second fixed metering restriction connecting the opposite sides of said piston, a port extending through a wall of said cylinder and cooperating with said piston so that the area of said port is varied by translation of said piston, said piston being movable in response to a change in the pressure differential across said restriction in a sense to vary said port area so as to restore said pressure differential to its previous value and hence to maintain the flow through said second restriction substantially constant, spring means acting on said piston in opposition to said pressure differential, and means responsive to the pressure in the fuel conduit on said other side of the metering restriction therein for varying the force of said spring means to vary the pressure differential and flow maintained by the action of said piston and thereby to maintain a constant ratio between said fuel flow and the flow of said supplementary fluid.

LEIGHTON LEE, II.

No references cited.